United States Patent
Fukuda et al.

(10) Patent No.: US 8,992,101 B2
(45) Date of Patent: Mar. 31, 2015

(54) HEATING DEVICE FOR OPTICAL-FIBER REINFORCEMENT, AND OPTICAL-FIBER FUSION SPLICING DEVICE

(75) Inventors: Masakazu Fukuda, Yokohama (JP); Ryuichiro Sato, Yokohama (JP); Hisao Yui, Yokohama (JP); Hiroshi Takayanagi, Yokohama (JP)

(73) Assignee: SEI Optifrontier Co., Ltd., Yokohama-shi, Kanagawa (JP)

( * ) Notice: Subject to any disclaimer, the term of this patent is extended or adjusted under 35 U.S.C. 154(b) by 80 days.

(21) Appl. No.: 13/883,870

(22) PCT Filed: Dec. 19, 2011

(86) PCT No.: PCT/JP2011/079399
§ 371 (c)(1),
(2), (4) Date: May 7, 2013

(87) PCT Pub. No.: WO2012/086598
PCT Pub. Date: Jun. 28, 2012

(65) Prior Publication Data
US 2013/0230286 A1  Sep. 5, 2013

(30) Foreign Application Priority Data
Dec. 24, 2010 (JP) ................................. 2010-288354

(51) Int. Cl.
*G02B 6/255* (2006.01)

(52) U.S. Cl.
CPC .............. *G02B 6/255* (2013.01); *G02B 6/2553* (2013.01); *G02B 6/2558* (2013.01)
USPC ............................................. 385/99; 385/96

(58) Field of Classification Search
None
See application file for complete search history.

(56) References Cited

U.S. PATENT DOCUMENTS

| 7,412,146 B2 * | 8/2008 | Sato et al. ..................... 385/134 |
| 7,753,597 B2 | 7/2010 | Kossat et al. |
| 2002/0124966 A1 | 9/2002 | Esmaeili |
| 2003/0091305 A1 * | 5/2003 | Brugger et al. ................. 385/95 |
| 2005/0123253 A1 * | 6/2005 | Sato ................................ 385/99 |
| 2014/0083141 A1 * | 3/2014 | Iwashita ......................... 65/484 |

FOREIGN PATENT DOCUMENTS

| CN | 101061404 | 10/2007 |
| CN | 201188133 Y | 1/2009 |
| JP | 2005-321644 A | 11/2005 |
| JP | 2007-065026 A | 3/2007 |
| JP | 2008-116773 A | 5/2008 |
| WO | WO 2008/132086 | 11/2008 |

\* cited by examiner

*Primary Examiner* — Mike Stahl
(74) *Attorney, Agent, or Firm* — Drinker Biddle & Reath LLP

(57) ABSTRACT

An optical fiber reinforcing heating device has a base part, to which a first lid part for covering a sleeve accommodation groove for containing a fiber reinforcement sleeve covering a fusion-splicing part of optical fibers is attached so as to be openable and closable. A pair of fiber holders for holding and securing the optical fibers are disposed on both end sides of the first lid part. Each fiber holder has a second lid part which is attached to a fiber container so as to be openable and closable and presses the optical fiber against the fiber container. A switch lever which is movable longitudinally of the sleeve accommodation groove is disposed on the upper face of the second lid part built in with a pin adapted to move in conjunction with the switch lever. A joint hole adapted to engage the pin is formed within the first lid part.

8 Claims, 10 Drawing Sheets

HEATING DEVICE FOR OPTICAL-FIBER REINFORCEMENT, AND OPTICAL-FIBER FUSION SPLICING DEVICE

TECHNICAL FIELD

The present invention relates to an optical fiber reinforcing heating device for heating and shrinking a fiber reinforcement sleeve covering a fusion-splicing part of an optical fiber and an optical fiber fusion-splicing device equipped with the optical fiber reinforcing heating device.

BACKGROUND ART

As an optical fiber reinforcing heating device for an optical fiber fusion-splicing device, one described in Patent Literature 1 has been known, for example. This optical fiber reinforcing heating device comprises a heating table, having a sleeve accommodation groove for containing a fiber reinforcement sleeve covering a fusion-splicing part of an optical fiber, for heating the fiber reinforcement sleeve; an openable and closable first lid part for covering the sleeve accommodation groove; and a pair of coated fiber pressing parts, disposed at both ends of the heating table, each having an openable and closable second lid part for pressing the optical fiber.

CITATION LIST

Patent Literature

Patent Literature 1: Japanese Patent Application Laid-Open Publication No. 2007-65026

SUMMARY OF INVENTION

Technical Problem

When heating and shrinking an optical fiber reinforcement sleeve covering a fusion-splicing part of an optical fiber, depending on working conditions and likings, some operators wish to open or close the first lid part for covering the sleeve accommodation groove and the second lid part for pressing the optical fiber together while the others do separately. However, only one of such two opening or closing modes can be selected in the above-mentioned conventional art.

It is an object of the present invention to provide an optical fiber reinforcing heating device and an optical fiber fusion-splicing device which allow operators by themselves to select modes of opening or closing a first lid part for covering a sleeve accommodation groove and a second lid part for pressing an optical fiber.

Solution to Problem

The optical fiber reinforcing heating device of the present invention is an optical fiber reinforcing heating device for heating and shrinking an optical fiber reinforcement sleeve covering a fusion-splicing part of an optical fiber. This optical fiber reinforcing heating device comprises a base part having a sleeve accommodation groove for containing the fiber reinforcement sleeve; an openable and closable first lid part for covering the sleeve accommodation groove; a pair of fiber holders for holding and securing the optical fiber, the pair of fiber holders having openable and closable second lid parts, arranged on both end sides of the sleeve accommodation groove, for pressing the optical fiber; and switch means for switching between a state of opening or closing the first and second lid parts together and a state of opening or closing the first and second lid parts separately.

When heating and shrinking a fiber reinforcement sleeve covering a fusion-splicing part of an optical fiber by using thus constructed optical fiber reinforcing heating device, the first lid part is closed in a state where the fiber reinforcement sleeve is contained in the sleeve accommodation groove of the base part, so as to cover the sleeve accommodation groove, while closing the second lid part of each fiber holder, so as to press and secure the optical fiber, and then the fiber reinforcement sleeve is heated. Here, for accurately containing the fiber reinforcement sleeve in a center part of the sleeve accommodation groove or securing the optical fiber without flexure by the fiber holders, for example, an operator causes the switch means to set the first and second lid parts to a state of opening or closing separately. For rapidly shrinking the fiber reinforcement sleeve, on the other hand, the operator causes the switch means to set the first and second lid parts to a state of opening or closing together. Thus, operators by themselves can select modes of opening or closing the first and second lid parts.

In the optical fiber reinforcing heating device, the switch means may have a switch lever disposed on an upper face of the second lid part and movable in an arrangement direction of the first and second lid parts; a pin built in with the second lid part and movable in the arrangement direction of the first and second lid parts in conjunction with the switch lever; and a joint hole, formed in the first lid part, for receiving the pin when the switch lever is moved toward the first lid part.

When the switch lever is operated to move toward the first lid part in such a structure, the pin moves toward the first lid part in conjunction with the switch lever, so as to be inserted into the joint hole. This joins the first and second lid parts together and places them into a state of opening or closing together. When the switch lever is operated to move to the opposite side of the first lid part, the pin moves to the opposite side of the first lid part in conjunction with the switch lever and pulls out of the joint hole, thereby releasing the joint between the first and second lid parts, thus placing the first and second lid parts into a state of opening or closing separately. Thus, the switch means can be achieved in a simple structure.

The optical fiber fusion-splicing device of the present invention comprises a fusion splicer for fusion-splicing optical fibers and the above-mentioned optical fiber reinforcing heating device.

Thus constructed optical fiber fusion-splicing device of the present invention allows the operators by themselves to select modes of opening or closing the first and second lid parts as mentioned above by providing the above-mentioned optical fiber reinforcing heating device.

Advantageous Effects of Invention

The present invention allows operators by themselves to select modes of opening or closing the first lid part for covering the sleeve accommodation groove and the second lid part for pressing the optical fiber. This makes it possible to set the fiber reinforcement sleeve and optical fiber appropriately or reduce the working man-hour.

DESCRIPTION OF EMBODIMENTS

In the following, embodiments of the optical fiber reinforcing heating device and optical fiber fusion-splicing device in accordance with the present invention will be explained in detail with reference to the drawings.

Figure 1:
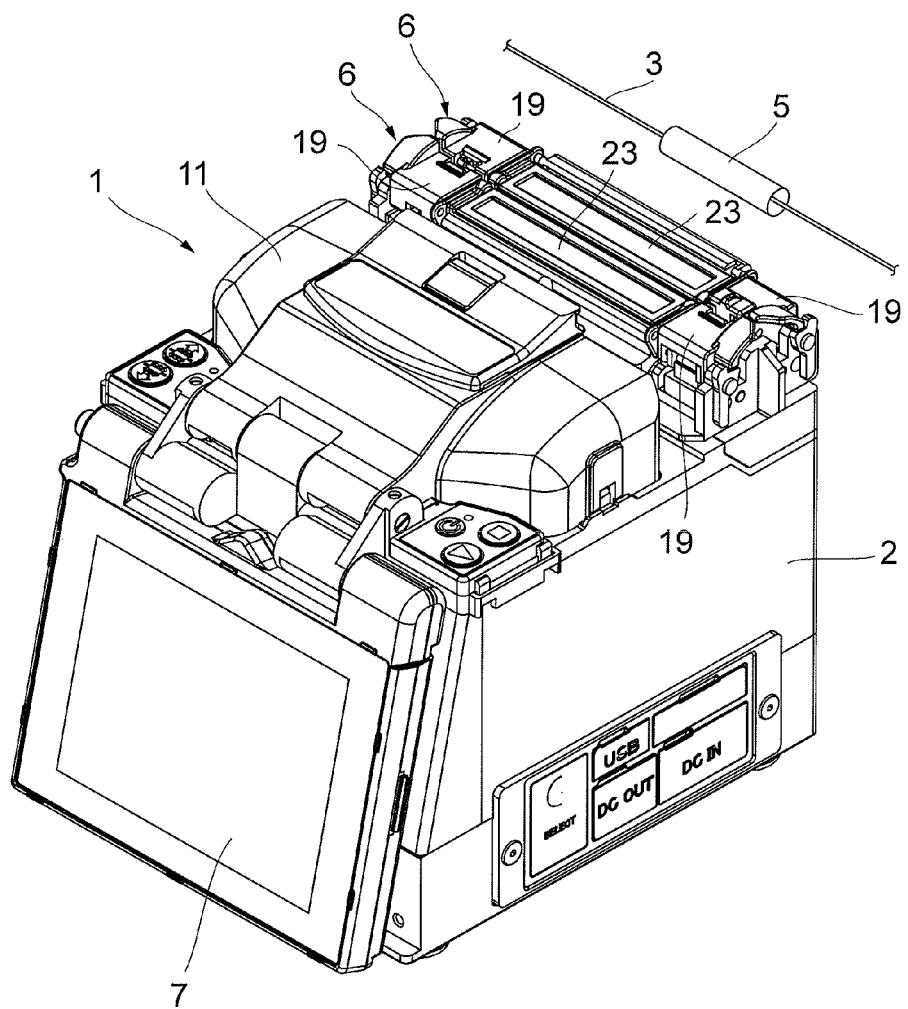
FIG. 1 is a perspective view illustrating the exterior of one embodiment of the optical fiber fusion-splicing device in accordance with the present invention.

FIG. 1 is a perspective view illustrating the exterior of one embodiment of the optical fiber fusion-splicing device in accordance with the present invention. In this drawing, the optical fiber fusion-splicing device 1 in accordance with this embodiment comprises a box-shaped housing 2. A fusion splicer 4 (see FIG. 2) and two optical fiber reinforcing heating devices 6 are disposed in the upper part of the housing 2. The fusion splicer 4 fusion-splices respective leading ends of two optical fibers 3 to each other. The optical fiber reinforcing heating devices 6 heat and shrink a fiber reinforcement sleeve 5 covering fusion-splicing parts of the optical fibers 3. The optical fiber fusion-splicing device 1 is also equipped with a monitor 7. The monitor 7 displays states of fusion-splicing of the optical fibers 3 captured by a camera (not depicted) arranged within the housing 2.

Figure 2:
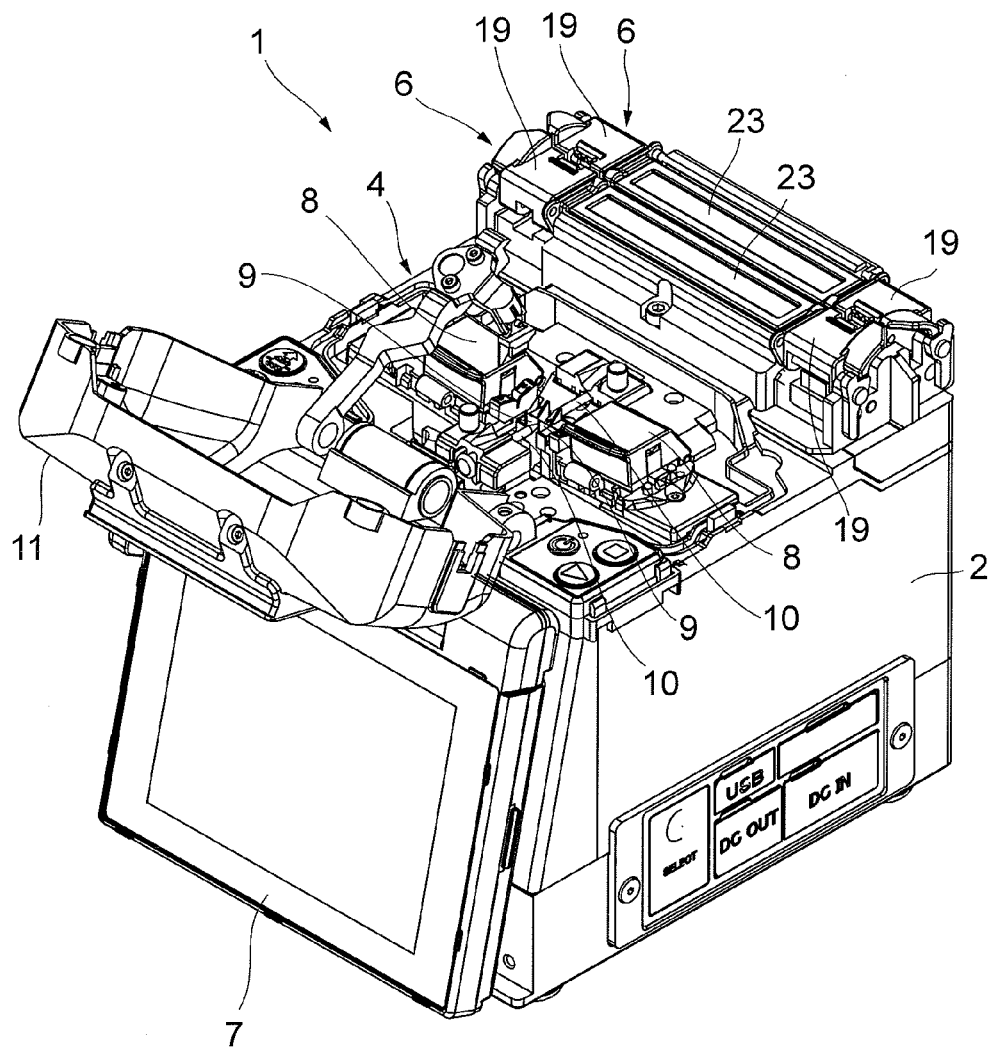
FIG. 2 is a perspective view illustrating the exterior of the optical fiber fusion-splicing device in a state where a windshield cover depicted in FIG. 1 is open.

As illustrated in FIG. 2, the fusion splicer 4 has a pair of fiber holders 8, a pair of fiber positioning parts 9, and a pair of discharging electrodes 10. The pair of fiber holders 8 hold and secure the two optical fibers 3. The pair of fiber positioning parts 9 are arranged between the fiber holders 8 and position the respective leading end parts of the optical fibers 3. The pair of discharging electrodes 10, which are arranged between the positioning parts 9, are electrodes for fusion-splicing the leading end parts of the optical fibers 3 by arc discharge. Thus constructed fusion splicer 4 is shrouded with a windshield cover 11 so as to be openable and closable.

Figure 3:
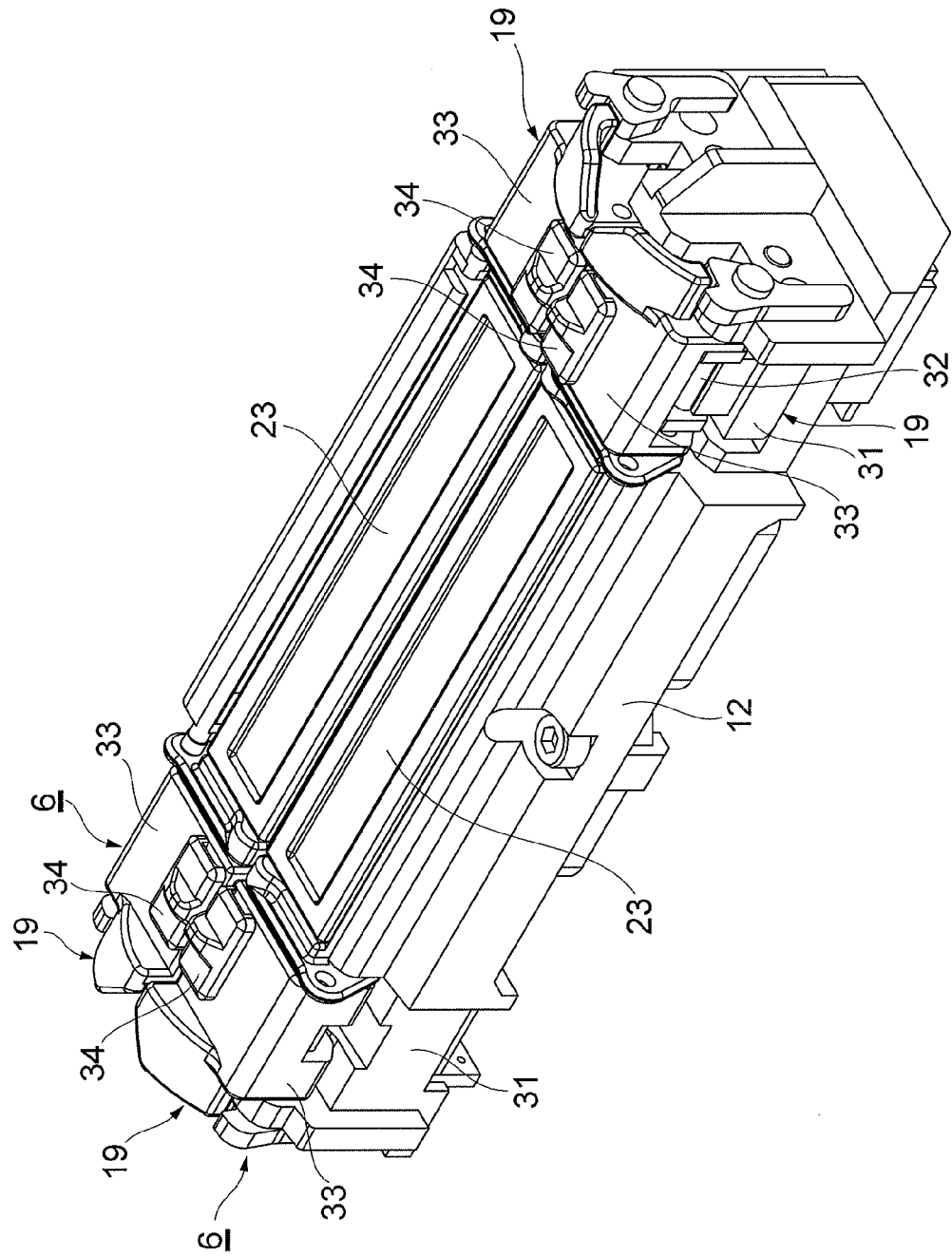
FIG. 3 is a perspective view illustrating the exterior of an optical fiber reinforcing heating device depicted in FIG. 1.

As illustrated in FIG. 3, each optical fiber reinforcing heating device 6 has a base part 12. The base part 12, which constitutes a housing for the optical fiber reinforcing heating device 6, is formed so as to extend not only in the bottom face part of the optical fiber reinforcing heating device 6 but also in side face parts thereof and the like. The base part 12 may be constructed by a member separate from the housing 2 or integrated therewith. The base part 12 is formed with a sleeve accommodation groove 13 (see FIGS. 7 and 8) for accommodating the fiber reinforcement sleeve 5. The base part 12 is also built in with a heater (not depicted) for heating the fiber reinforcement sleeve 5 contained in the sleeve accommodation groove 13.

A lid part 23 (first lid part) for covering the sleeve accommodation groove 13 is attached so as to be openable and closable to the base part 12 through a rotary axis (not depicted). The lid part 23 is formed from a transparent resin or the like so that how the fiber reinforcement sleeve 5 shrinks can be seen visually, for example.

A pair of fiber holders 19 for holding and securing the respective optical fibers 3 fusion-spliced by the fusion splicer 4 are disposed on both end sides of the sleeve accommodation groove 13 (lid part 23). Each fiber holder 19 is constituted by a fiber container 31 for containing the optical fiber 3 and a lid part 33 (second lid part), which is attached to the fiber container 31 through a rotary shaft 32 so as to be openable and closable, for pressing the optical fiber 3 against the fiber container 31.

The upper face of the lid part 33 is provided with a switch lever 34 which is movable longitudinally of the sleeve accommodation groove 13 (in the arrangement direction of the sleeve accommodation groove 13 and fiber holder 19).

Figure 4:
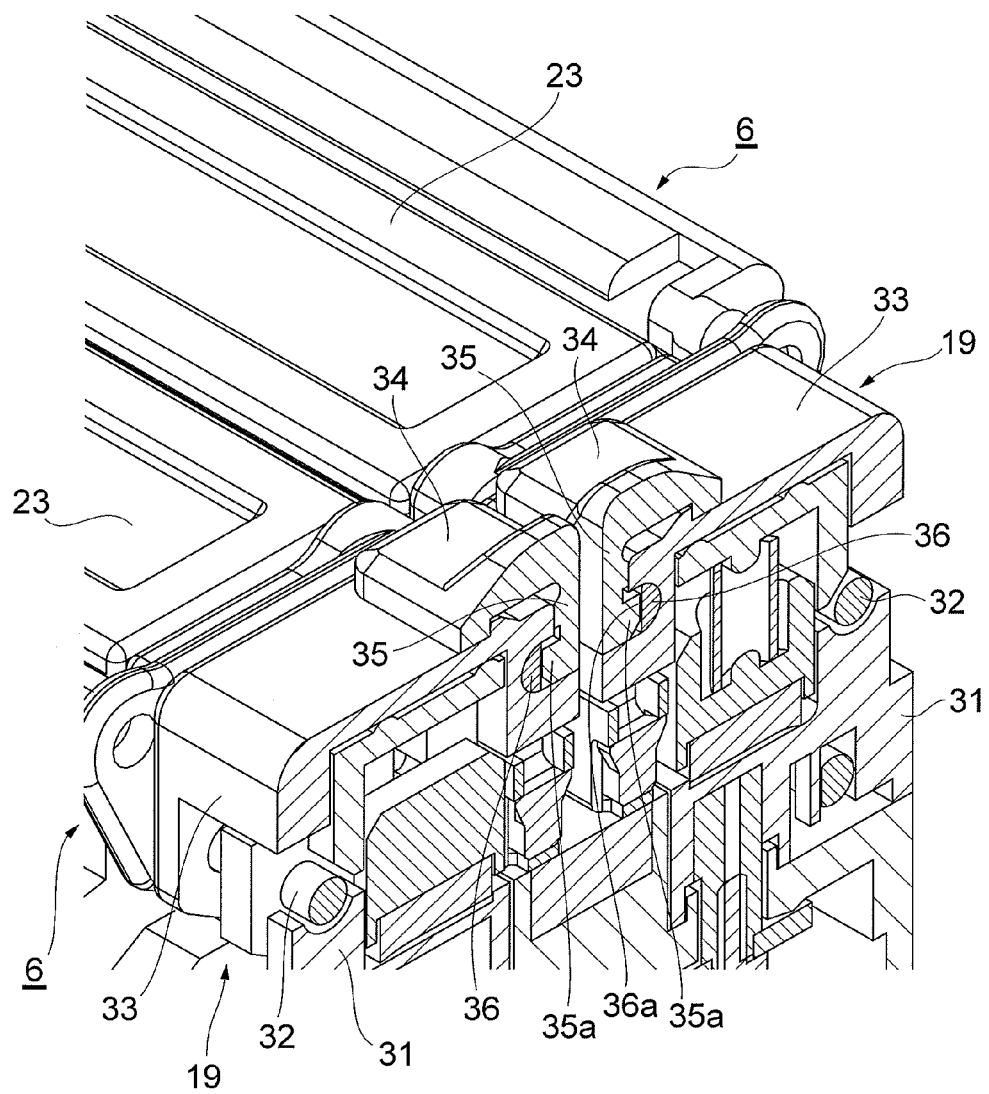
FIG. 4 is a sectional perspective view illustrating a main part of the optical fiber reinforcing heating device depicted in FIG. 3.

As illustrated in FIG. 4, the switch lever 34 has a latch 35 extending to the lower side of the lid part 33, while a leading end part (lower end part) of the latch 35 is provided with a pawl 35a. The lid part 33 is built in with a pin 36 extending longitudinally of the sleeve accommodation groove 13, while the pin 36 is formed with a stopper recess 36a adapted to engage the pawl 35a of the latch 35. Fitting the pawl 35a into the stopper recess 36a brings the switch lever 34 and the pin 36 into engagement with each other, so that the pin 36 can move longitudinally of the sleeve accommodation groove 13 in conjunction with the switch lever 34. A joint hole 37 adapted to engage the pin 36 is also formed within the lid part 23 (see FIG. 6).

Figure 5:
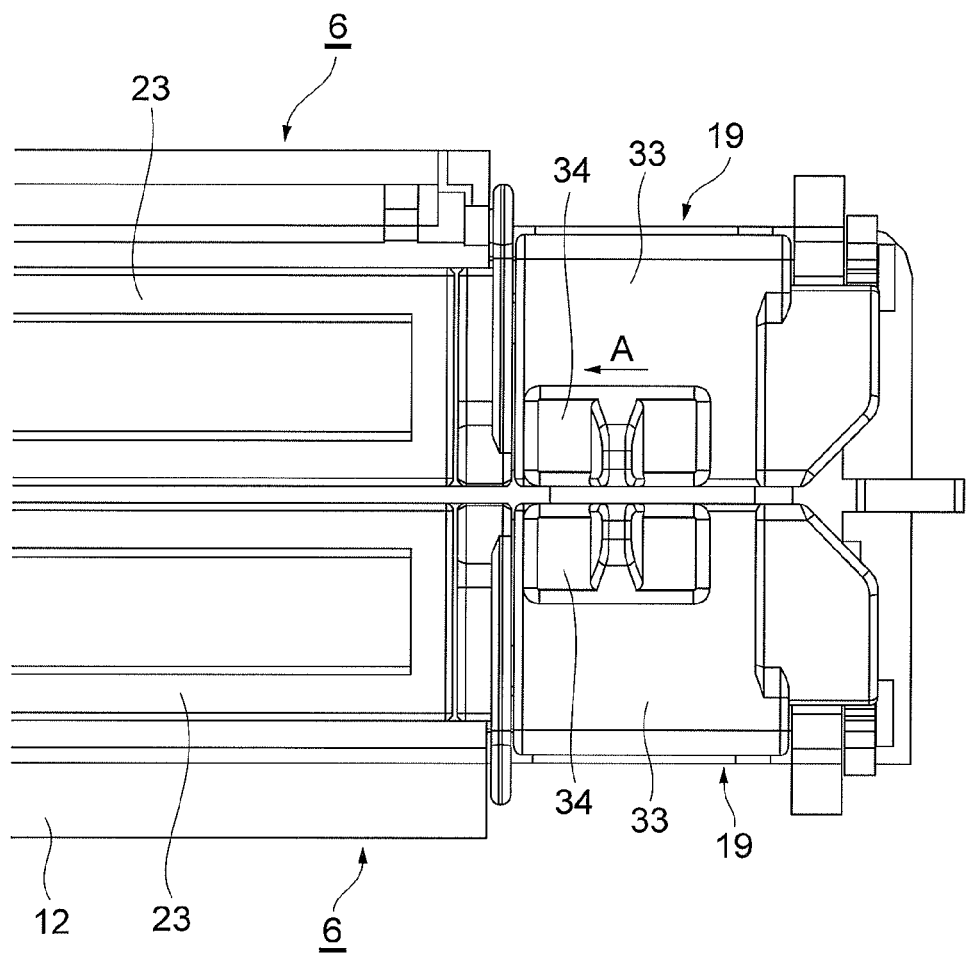
FIG. 5 is a plan view of the optical fiber reinforcing heating device in a state where a switch lever depicted in FIG. 3 is moved toward a sleeve accommodation groove.
Figure 6:
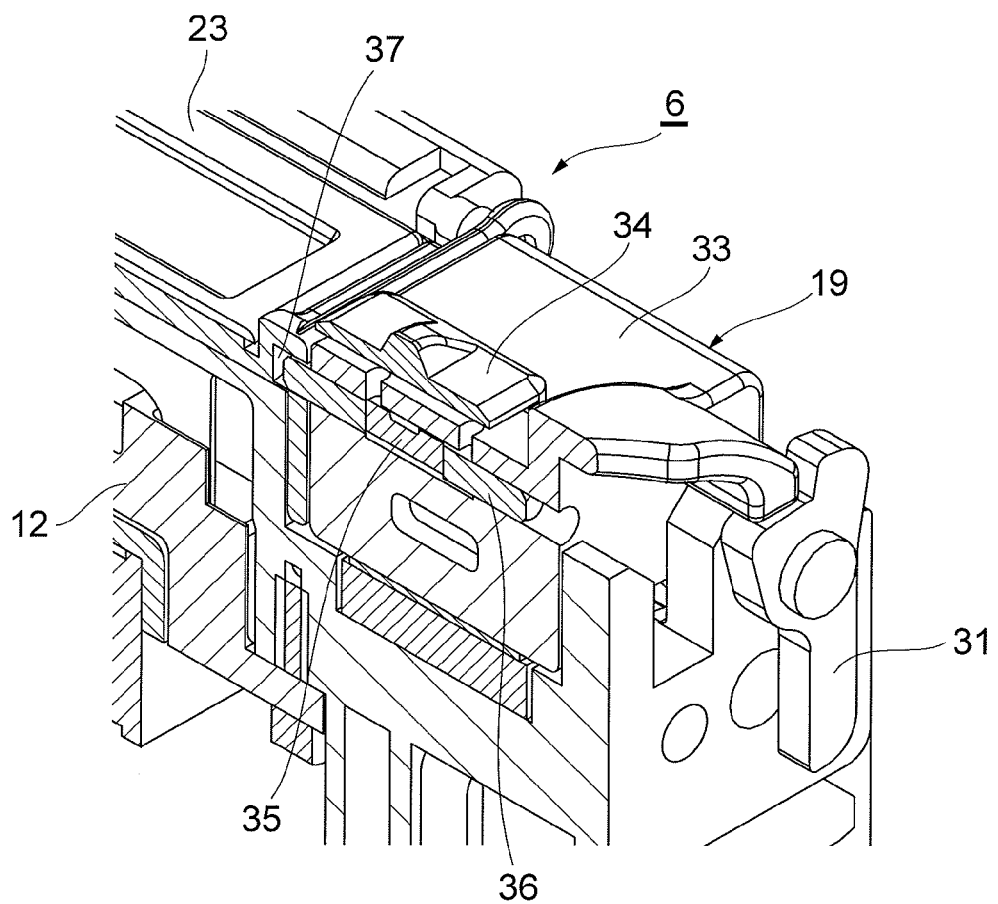
FIG. 6 is a sectional perspective view illustrating a main part of the optical fiber reinforcing heating device illustrated in FIG. 5.
Figure 7:
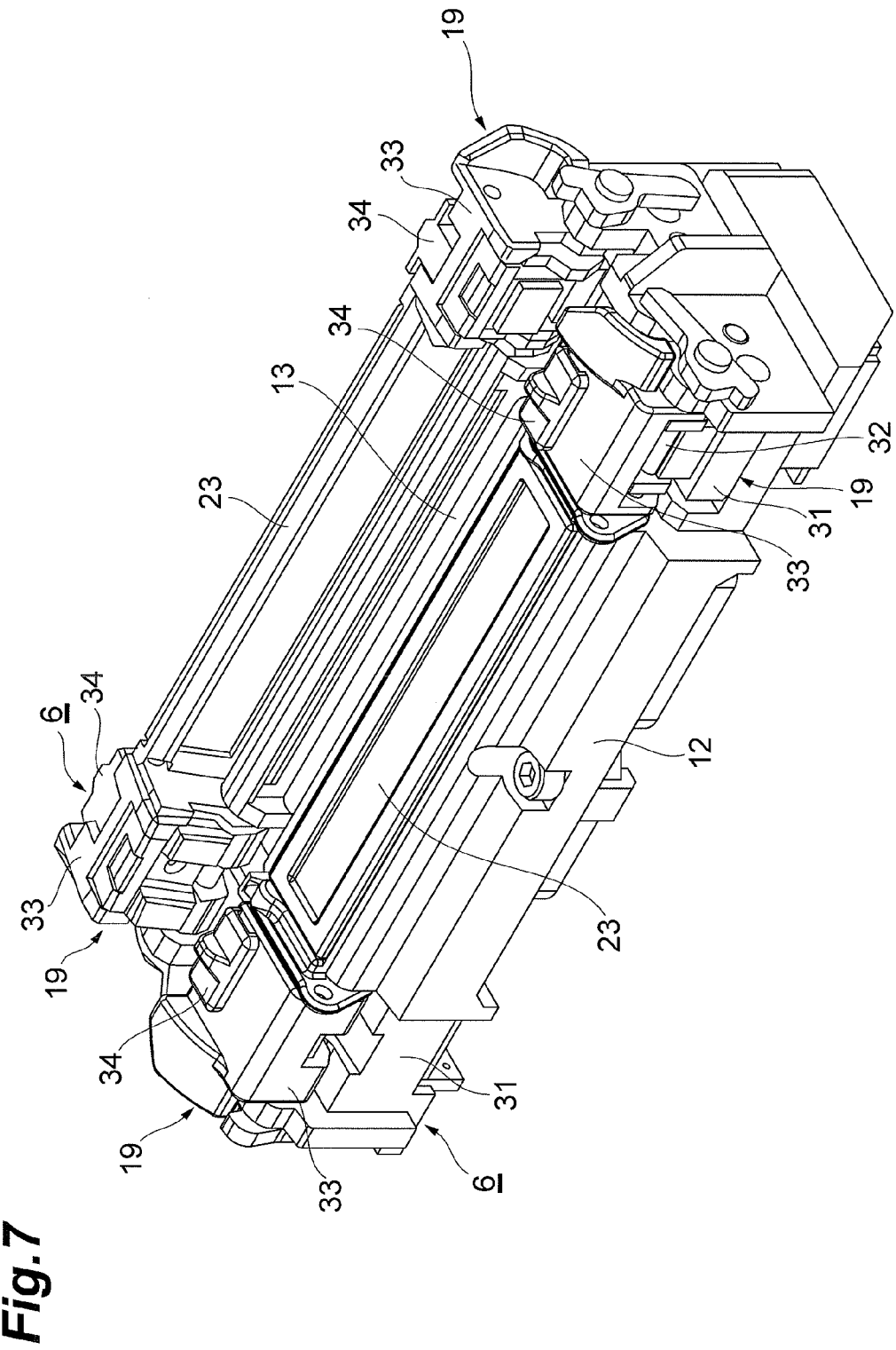
FIG. 7 is a perspective view illustrating a state where lid parts of the optical fiber reinforcing heating device depicted in FIG. 5 are open.

When the switch lever 34 is moved toward the lid part 23 (in the direction of arrow A) as illustrated in FIG. 5, the pin 36 moves toward the lid part 23 in conjunction with the switch lever 34, so as to be inserted into the joint hole 37 as illustrated in FIG. 6. This joins the lid parts 23, 33 together, whereby the lid parts 23, 33 can be opened and closed together as illustrated in FIG. 7.

Figure 8:
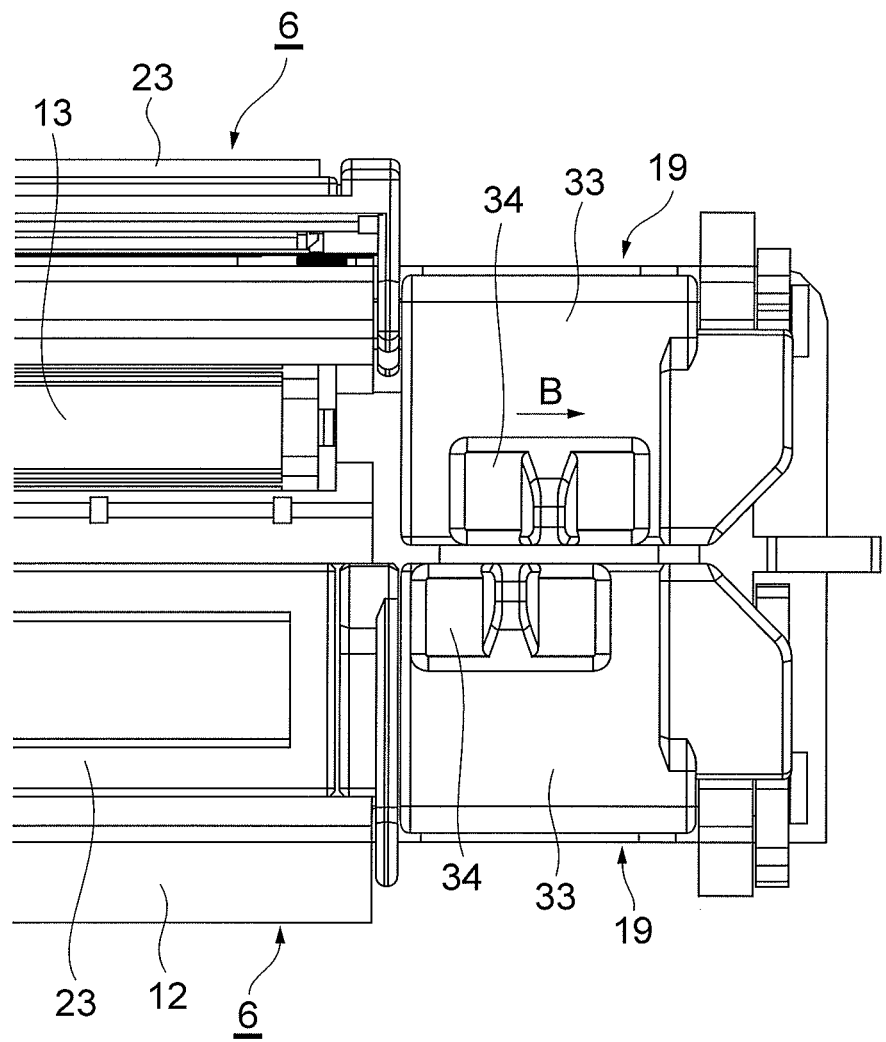
FIG. 8 is a plan view of the optical fiber reinforcing heating device in a state where the switch lever depicted in FIG. 3 is moved to the opposite side of the sleeve accommodation groove.
Figure 9:
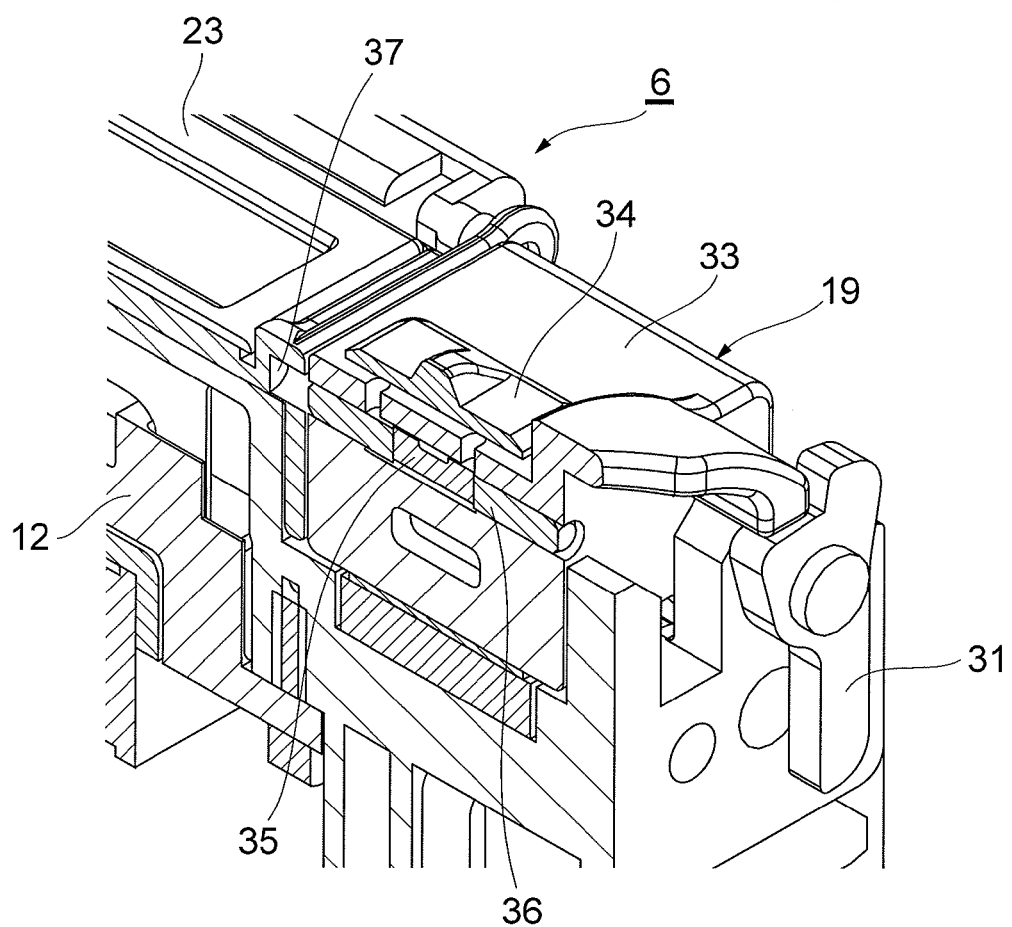
FIG. 9 is a sectional perspective view of a main part of the optical fiber reinforcing heating device illustrated in FIG. 8.

When the switch lever 34 is moved to the opposite side of the lid part 23 (in the direction of arrow B) as illustrated in FIG. 8, the pin 36 moves to the opposite side of the lid part 23 in conjunction with the switch lever 34, so as to pull out of the joint hole 37 as illustrated in FIG. 9. This releases the joint between the lid parts 23, 33, whereby the lid parts 23, 33 can be opened and closed separately (independently) as illustrated in FIG. 10.

Figure 10:
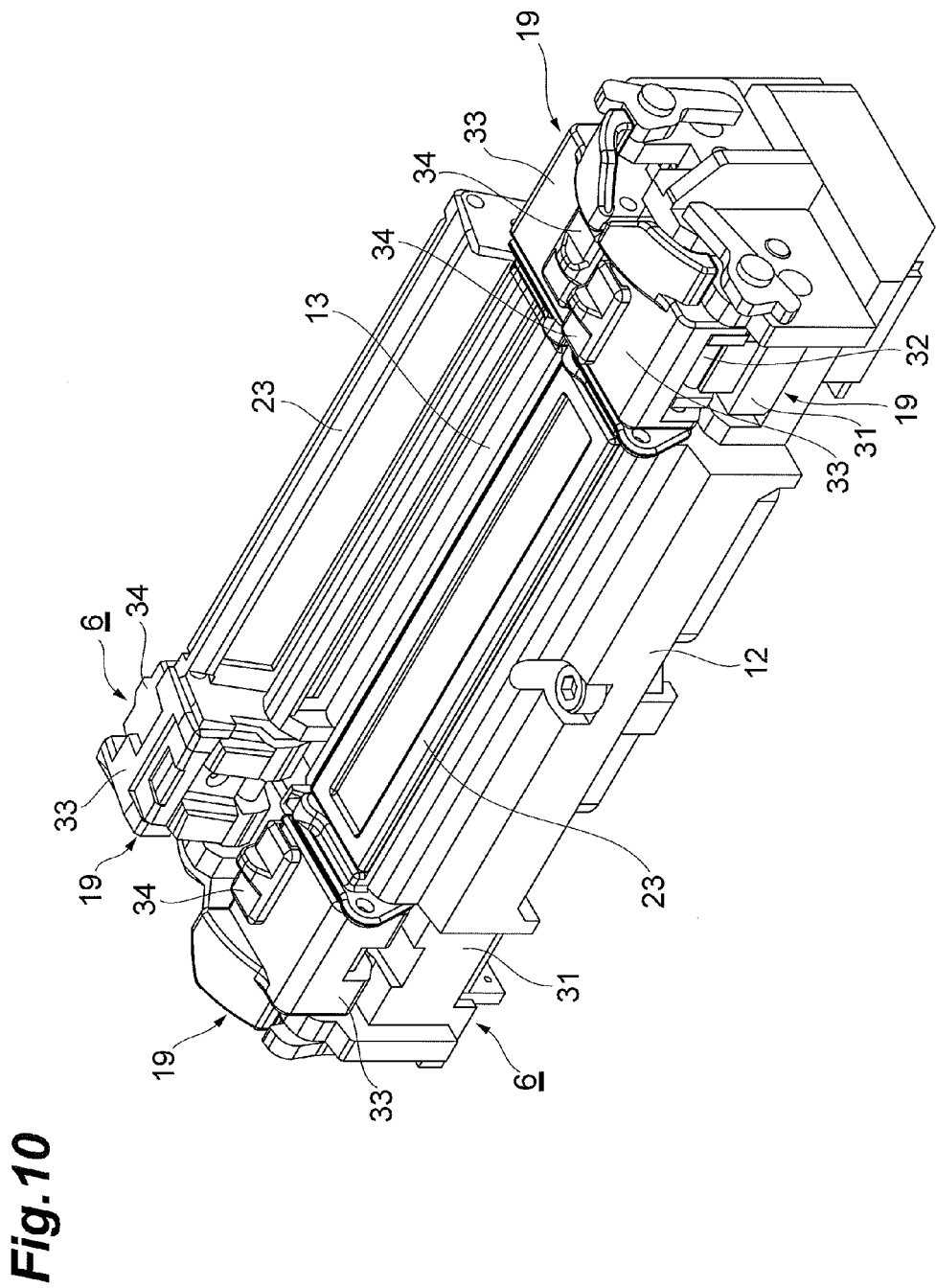
FIG. 10 is a perspective view of the optical fiber reinforcing heating device illustrated in FIG. 8.

FIG. 10 illustrates a state where one lid part 33 is joined to the lid part 23, while the other lid part 33 is not joined to the lid part 23. In this state, the lid parts 23, 33 can be opened or closed in two actions. Here, the lid part 33 to be joined to the lid part 23 may be determined according to easiness in operation or the operator's dominant hand, for example. FIG. 7 illustrates a state where both of the lid parts 33 are joined to the lid parts 23. In this state, the lid parts 23, 33 can be opened or closed in one action.

Here, the switch lever 34, pin 36, and joint hole 37 construct switch means for switching between the state of opening or closing the lid parts 23, 33 together and the state of opening or closing the lid parts 23, 33 separately.

When performing a fusion-splicing operation by using thus constructed optical fiber fusion-splicing device 1, the operator initially fusion-splices two optical fibers 3 together by the fusion splicer 4. Specifically, the operator passes one optical fiber 3 through the fiber reinforcement sleeve 5 beforehand. Subsequently, while the windshield cover 11 is open, the operator butts the leading ends of the optical fibers 3 against each other at the respective fiber positioning parts 9, while holding and securing the optical fibers 3 with the respective fiber holders 8. Then, the operator closes the windshield cover 11 and fuses the leading ends of the optical fibers 3 to each other upon discharging by the discharge electrodes 10.

Next, the operator takes out the fusion-spliced optical fibers 3 from the fusion splicer 4 and heats and shrinks the fiber reinforcement sleeve 5 with the optical fiber reinforcing heating device 6, thereby reinforcing the fusion-spliced part of the optical fibers 3.

Specifically, in a state where both of the lid parts 23, 33 are open as illustrated in FIG. 7, the operator moves the fiber reinforcement sleeve 5 to the fusion-spliced part of the optical fibers 3 and puts it into the sleeve accommodation groove 13 of the base part 12. Subsequently, as illustrated in FIG. 3, the operator closes the lid part 23, so as to cover and shut the sleeve accommodation groove 13, while closing the lid parts 33, so as to secure the optical fibers 3 by pressing them against the fiber containers 31. In this state, the operator energizes the heater (not depicted), so as to heat and shrink the fiber reinforcement sleeve 5.

Here, the heater is set such that temperature is the highest in the center part of the sleeve accommodation groove 13 and gradually decreases toward the end parts thereof when energized, which makes it desirable for the fiber reinforcement sleeve 5 to be set in the center part of the sleeve accommodation groove 13.

When one lid part 33 is joined to the lid part 23 while the other lid part 33 is not joined to the lid part 23 as illustrated in FIG. 10, the lid parts 23, 33 are opened or closed in two actions, whereby the fiber reinforcement sleeve 5 can be contained in the center part of the sleeve accommodation groove 13 easily and securely. In this case, the heater effectively heats the fiber reinforcement sleeve 5, so that air is hard to enter the fiber reinforcement sleeve 5. This prevents glass parts of the optical fibers 3 from being broken and cut by thermal expansion of air within the fiber reinforcement sleeve 5.

Opening or closing the lid parts 23, 33 in two actions makes it possible for the lid parts 33 to press the optical fibers 3 without flexure under tension. This can inhibit the optical fiber 3 from increasing its splice loss.

When both of the lid parts 33 are joined to the lid part 23 as illustrated in FIG. 7, on the other hand, the lid parts 23, 33 are opened or closed in one action, which can reduce the working man-hour, thereby shortening the operation time.

In this embodiment, as in the foregoing, the pin 36 movable longitudinally of the sleeve accommodation groove 13 in conjunction with the switch lever 34 is provided in the lid part 33, while the joint hole 37 adapted to engage the pin 36 is formed in the lid part 23. Hence, changing the direction of moving the switch lever 34 can switch between the state of opening or closing the lid parts 23, 33 together and the state of opening or closing the lid parts 23, 33 separately. This allows operators by themselves to select modes of opening or closing the lid parts 23, 33 according to working conditions and their likings. Hence, operators can perform operations effective for them.

The present invention is not limited to the above-mentioned embodiment. For example, the upper face of the housing 12, which is provided with two optical fiber reinforcing heaters 6 in the above-mentioned embodiment, may be provided with one optical fiber reinforcing heating device 6 alone or a plurality of optical fiber reinforcing heating devices 6.

The optical fiber fusion-splicing device 1, which fusion-splices single-core optical fibers 3 to each other in the above-mentioned embodiment, may fusion-splice multicore optical fibers collectively to each other.

REFERENCE SIGNS LIST

1 . . . optical fiber fusion-splicing device; 3 . . . optical fiber; 4 . . . fusion splicer; 5 . . . fiber reinforcement sleeve; 6 . . . optical fiber reinforcing heating device; 12 . . . base part; 13 . . . sleeve accommodation groove; 19 . . . fiber holder; 23 . . . lid part (first lid part); 33 . . . lid part (second lid part); 34 . . . switch lever; 36 . . . pin; 37 . . . joint hole.

The invention claimed is:

1. An optical fiber reinforcing heating device for heating and shrinking an optical fiber reinforcement sleeve covering a fusion-splicing part of an optical fiber, the optical fiber reinforcing heating device comprising:
   a base part having a sleeve accommodation groove for containing the fiber reinforcement sleeve;
   an openable and closable first lid part for covering the sleeve accommodation groove;
   a pair of fiber holders for holding and securing the optical fiber, the pair of fiber holders having openable and closable second lid parts, arranged on both end sides of the sleeve accommodation groove, for pressing the optical fiber; and
   switch means for switching between a state of opening or closing the first lid part and one of the second lid parts together and a state of opening or closing the first lid part and the one of the second lid parts separately.

2. An optical fiber reinforcing heating device according to claim 1, wherein the switch means has:
   a switch lever disposed on an upper face of the one of the second lid parts and movable in an arrangement direction of the first lid part and the one of the second lid parts;
   a pin built in with the one of the second lid parts and movable in the arrangement direction of the first lid part and the one of the second lid parts in conjunction with the switch lever; and
   a joint hole, formed in the first lid part, for receiving the pin when the switch lever is moved toward the first lid part.

3. An optical fiber fusion-splicing device comprising:
   a fusion splicer for fusion-splicing optical fibers; and
   the optical fiber reinforcing heating device according to claim 1.

4. An optical fiber fusion-splicing device comprising:
   a fusion splicer for fusion-splicing optical fibers; and
   the optical fiber reinforcing heating device according to claim 2.

5. An optical fiber reinforcing heating device configured to heat and shrink an optical fiber reinforcement sleeve covering a fusion-splicing part of an optical fiber, the optical fiber reinforcing heating device comprising:
   a base part having a sleeve accommodation groove configured to contain the fiber reinforcement sleeve;
   an openable and closable first lid part configured to cover the sleeve accommodation groove;
   a pair of fiber holders configured to hold and secure the optical fiber, the pair of fiber holders having openable and closable second lid parts, arranged on both end sides of the sleeve accommodation groove, configured to press the optical fiber; and
   a switch configured to switch between a state of opening or closing the first lid part and one of the second lid parts together and a state of opening or closing the first and second lid parts the first lid part and the one of the second lid parts separately.

6. An optical fiber reinforcing heating device according to claim 5, wherein the switch has:
   a switch lever disposed on an upper face of the one of the second lid parts and movable in an arrangement direction of the first lid part and the one of the second lid parts;
   a pin built in with the one of the second lid parts and movable in the arrangement direction of the first lid part and the one of the second lid parts in conjunction with the switch lever; and
   a joint hole, formed in the first lid part, configured to receive the pin when the switch lever is moved toward the first lid part.

7. An optical fiber fusion-splicing device comprising:
   a fusion splicer configured to fusion-splice optical fibers; and
   the optical fiber reinforcing heating device according to claim 5.

8. An optical fiber fusion-splicing device comprising:
   a fusion splicer configured to fusion-splice optical fibers; and
   the optical fiber reinforcing heating device according to claim 6.

* * * * *